United States Patent
Oh et al.

(10) Patent No.: US 11,002,201 B1
(45) Date of Patent: May 11, 2021

(54) METHOD OF CALCULATING AIR VOLUME IN ACTIVE PURGE SYSTEM

(71) Applicants: Hyundai Motor Company, Seoul (KR); Kia Motors Corporation, Seoul (KR)

(72) Inventors: Young-Kyu Oh, Whasung-Si (KR); Keum-Jin Park, Whasung-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/922,588

(22) Filed: Jul. 7, 2020

(30) Foreign Application Priority Data

Mar. 16, 2020 (KR) .......................... 10-2020-0031906

(51) Int. Cl.
| | |
|---|---|
| *F02D 41/08* | (2006.01) |
| *F02D 41/00* | (2006.01) |
| *G01K 3/00* | (2006.01) |
| *G01F 1/688* | (2006.01) |
| *G01F 1/76* | (2006.01) |
| *G01L 13/00* | (2006.01) |

(Continued)

(52) U.S. Cl.
CPC ............ *F02D 41/0045* (2013.01); *F02D 9/08* (2013.01); *F02D 13/0223* (2013.01); *F02D 41/004* (2013.01); *F02M 25/0836* (2013.01); *F02M 35/10222* (2013.01); *F02M 35/10386* (2013.01); *G01F 1/688* (2013.01); *G01F 1/76* (2013.01); *G01F 22/02* (2013.01); *G01K 3/005* (2013.01); *G01L 13/00* (2013.01); *F02D 2200/0406* (2013.01)

(58) Field of Classification Search
CPC ...... F02D 41/004; F02D 41/0045; F02D 9/08; F02D 13/0223; F02D 2200/0406; F02M 35/10386; F02M 35/10222; F02M 25/0836; G01K 3/005; G01F 1/76; G01F 1/688; G01F 22/02; G01L 13/00
USPC ..... 123/516, 518, 519, 520, 568.16, 568.19, 123/568.21; 701/103–105, 107, 108
See application file for complete search history.

(56) References Cited

U.S. PATENT DOCUMENTS 5,924,956 A * 7/1999 Kobayashi .......... F02D 41/0042
477/111

FOREIGN PATENT DOCUMENTS

KR 10-1251090 B1 4/2013

* cited by examiner

*Primary Examiner* — Hai H Huynh
(74) *Attorney, Agent, or Firm* — Morgan, Lewis & Bockius LLP

(57) ABSTRACT

A method of determining an air volume in an active purge system may include checking whether an engine operates in an idle state; determining an air volume reaching a combustion chamber of the engine in response to a signal received from a sensor provided in an intake pipe; checking whether an evaporation gas collected in a canister is introduced into the intake pipe; estimating an amount of the evaporation gas introduced into the intake pipe and primarily correcting the air volume determined according to the estimated amount of the evaporation gas; checking whether an opening holding time of an intake valve in the engine is varied due to an operation of a continuously variable valve duration (CVVD) system electrically connected to the controller; and deriving a correction variable by substituting an operation duty of the CVVD system into a formula, a table, or a map provided in advance, and secondarily correcting the primarily corrected air volume according to the correction variable.

17 Claims, 4 Drawing Sheets

(51) Int. Cl.
*G01F 22/02* (2006.01)
*F02M 35/10* (2006.01)
*F02D 13/02* (2006.01)
*F02M 25/08* (2006.01)
*F02D 9/08* (2006.01)

METHOD OF CALCULATING AIR VOLUME IN ACTIVE PURGE SYSTEM

CROSS-REFERENCE TO RELATED APPLICATION

The present application claims priority to Korean Patent Application No. 10-2020-0031906, filed on Mar. 16, 2020, the entire contents of which is incorporated herein for all purposes by this reference.

BACKGROUND OF PRESENT INVENTION

Field of Present Invention

The present invention relates to a method of determining an air volume in an active purge system. More particularly, it relates to a method of determining an air volume in an active purge system, which prevents misfire even though an evaporation gas is purged or a continuously variable valve duration (CVVD) system is operated when an operating state of an engine is changed from an idle state to a part load state.

Description of Related Art

A ratio of intake air and fuel, which allows the fuel to be burned completely and chemically in a combustion chamber, is referred to as a theoretical air-fuel ratio. To generate combustion satisfying the theoretical air-fuel ratio in the combustion chamber, an amount of the intake air is measured, and the fuel is supplied according to the amount of the intake air.

FIG. 1 is a schematic diagram illustrating an engine in which a manifold absolute pressure (MAP) sensor is provided between a throttle valve and the combustion chamber. As shown in FIG. 1, fuel is injected according to an amount of intake air measured by the MAP sensor. In the instant case, it is assumed that the air passing through a throttle valve reaches a combustion chamber.

FIG. 2 is a schematic diagram illustrating an engine with an exhaust gas recirculation (EGR). When the EGR is applied to the engine, the amount of the intake air may be determined through a hot-film air mass flow (HFM) sensor provided between an air filter and the throttle valve or the determined through the MAP sensor provided between the throttle valve and the combustion chamber. Even in the instant case, it is assumed that the air passing through the throttle valve reaches the combustion chamber.

However, when the engine is switched from an idle state to a part load state or switched from the part load state to the idle state, the air passing through the throttle valve does not continuously reach the combustion chamber according to the number of RPM of the engine and timings of opening and closing of intake and exhaust valves.

In the instant case, when the fuel is injected according to the amount of the intake air determined through the HFM sensor or the MAP sensor, a lambda value (actual air-fuel ratio/theoretical air-fuel ratio) is smaller than 1 (rich) or greater than 1 (lean), and there is a probability in that misfire occurs.

To prevent misfire, fuel is injected such that a lambda value becomes a range of 0.7 to 0.9 according to a determined amount of intake air.

Meanwhile, an evaporation gas is collected in a canister. According to evaporation gas regulations, the evaporation gas may be treated appropriately. In the case of a hybrid vehicle or a plug-in hybrid vehicle, there is an attempt to minimize an engine load by treating the evaporation gas before and after a starting and increase energy efficiency by increasing a motor driving section.

Furthermore, to improve fuel efficiency, there is a tendency in which a continuously variable valve duration (CVVD) system configured for controlling opening holding times of an intake valve and an exhaust valve is applied to a hybrid vehicle or a plug-in hybrid vehicle.

However, since the evaporation gas reaches the combustion chamber during evaporation gas treatment, the lambda value is reduced. According to an operation of the CVVD system, an amount of the intake air reaching the combustion chamber may be reduced or increased, and an amount of an exhaust gas remaining in the combustion chamber may be reduced or increased.

That is, when an operating state of the engine of the hybrid vehicle or the plug-in hybrid vehicle is changed from the idle state to the part load state, and the evaporation gas is treated or the CVVD system is operated, a common method of preventing misfire by injecting a large fuel amount cannot prevent the misfire as well as there is a probability in which an exhaust gas is more generated.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY OF PRESENT INVENTION

Various aspects of the present invention are directed to providing a method of determining an air volume in an active purge system, which prevents misfire even though an evaporation gas is purged or a continuously variable valve duration (CVVD) system is operated when an operating state of an engine is changed from an idle state to a part load state.

Other objects and advantages of the present invention may be understood by the following description and become apparent with reference to the exemplary embodiments of the present invention. Also, it is obvious to those skilled in the art to which an exemplary embodiment of the present invention pertains that the objects and advantages of the present invention may be realized by the means as claimed and combinations thereof.

In accordance with various exemplary embodiments of the present invention, there is provided checking, by a controller, whether an engine operates in an idle state; determining, by the controller, an air volume reaching a combustion chamber of the engine in a response to a signal received from a sensor provided in an intake pipe; checking, by the controller, whether an evaporation gas collected in a canister is introduced into the intake pipe; when the evaporation gas is determined as being introduced into the intake pipe, estimating, by the controller, an amount of the evaporation gas introduced into the intake pipe and arithmetically primarily correcting the air volume determined according to the estimated amount of the evaporation gas; checking, by the controller, whether an opening holding time of an intake valve in the engine is varied due to an operation of a continuously variable valve duration (CVVD) system electrically connected to the controller; and deriving, by the controller, a correction variable by substituting an operation duty of the CVVD system into a predetermined formula, a predetermined table, or a predetermined map, and arithmetically secondarily correcting the primarily corrected air volume according to the correction variable.

Furthermore, in the checking of whether the engine operates in the idle state, the controller may check whether a temperature of a cooling water of the engine is greater than or equal to an predetermined value, and when the engine is not in the idle state or the temperature of the cooling water is less than the predetermined value, the controller may interrupt evaporation gas purge treatment or an operation of the CVVD system Furthermore, the sensor may include a hot-film air mass flow (HFM) sensor located between an air filter and a throttle valve and a manifold absolute pressure sensor (MAP) located between the throttle valve and the combustion chamber.

Furthermore, the canister may be connected to the intake pipe through a purge line, a purge control valve may be provided in the purge line, a purge pump may be provided between the purge control valve and the purge line, a first pressure sensor may be provided between the canister and the purge pump, a second pressure sensor may be provided between the purge pump and the purge control valve, and the controller may estimate the amount of the evaporation gas from an operation duty of the purge pump.

Furthermore, the controller may estimate the amount of the evaporation gas from the number of RPM of the purge pump, opening and closing timings of the purge control valve, an opening amount of the purge control valve, a signal generated from the first pressure sensor, and a signal generated from the second pressure sensor.

Furthermore, the engine may operate according to the primarily or secondarily corrected air volume, and to determine or correct the air volume according to an amount of oxygen contained in an exhaust gas discharged from the engine, the formula, table, or map stored in the controller may be learning-corrected.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
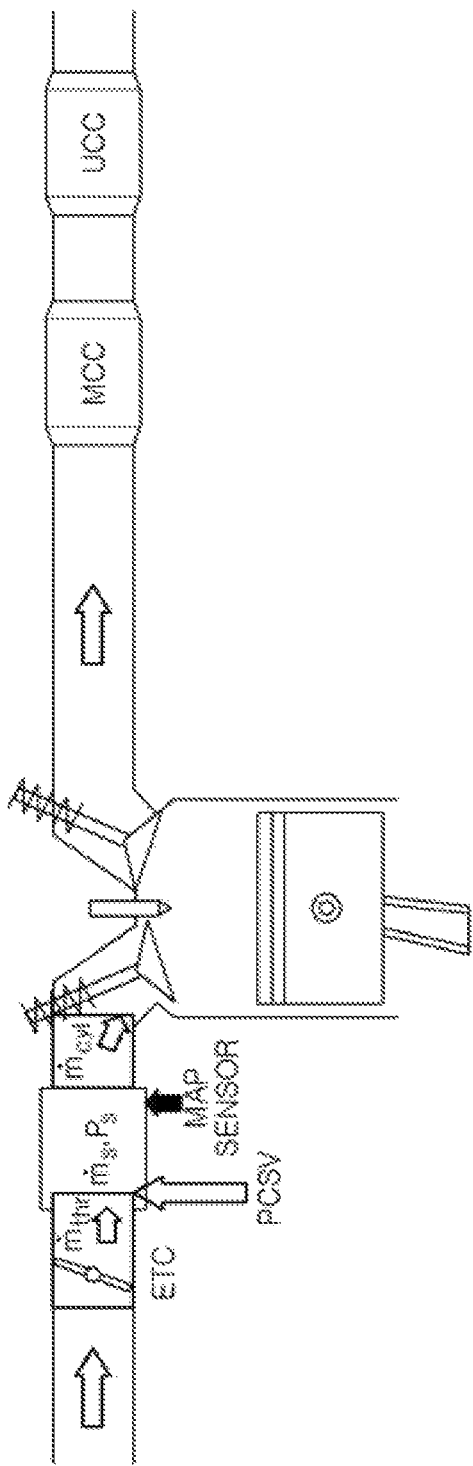
FIG. 1 is an exemplary diagram illustrating an engine with a manifold absolute pressure (MAP) sensor.
Figure 2:
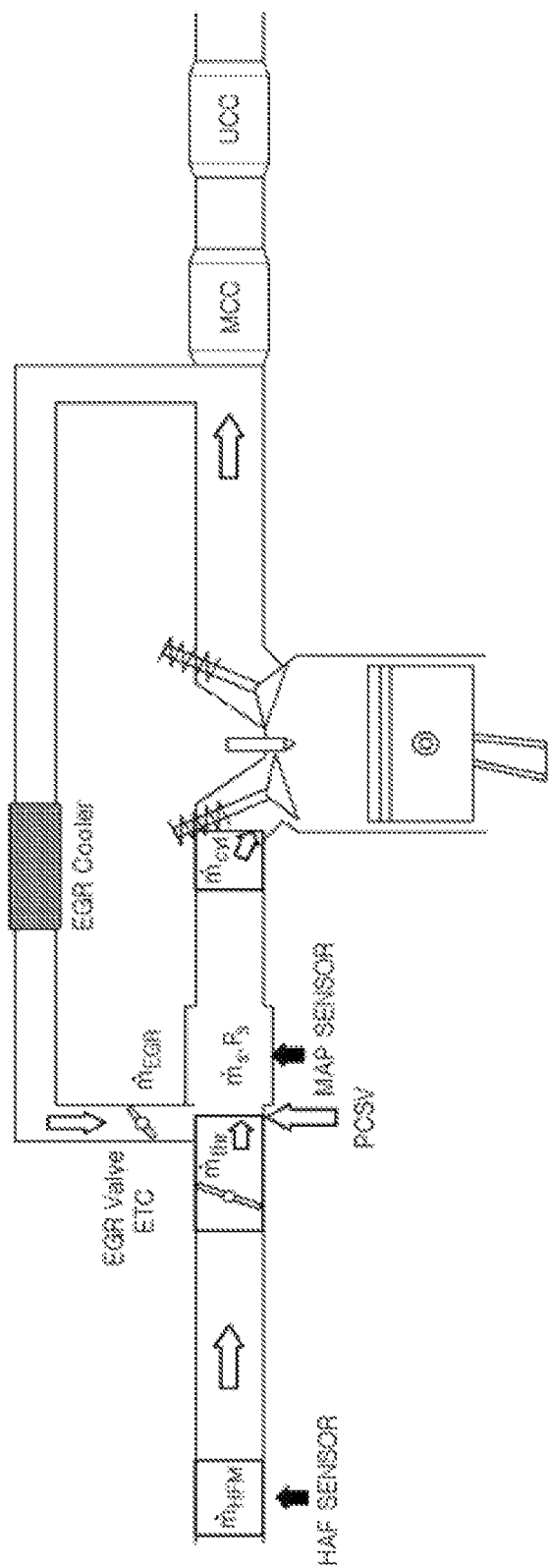
FIG. 2 is an exemplary diagram illustrating the engine to which an exhaust gas recirculation (EGR).

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, a method of determining an air volume in an active purge system according to an exemplary embodiment of the present invention will be described with reference to the accompanying drawings.

Figure 3:
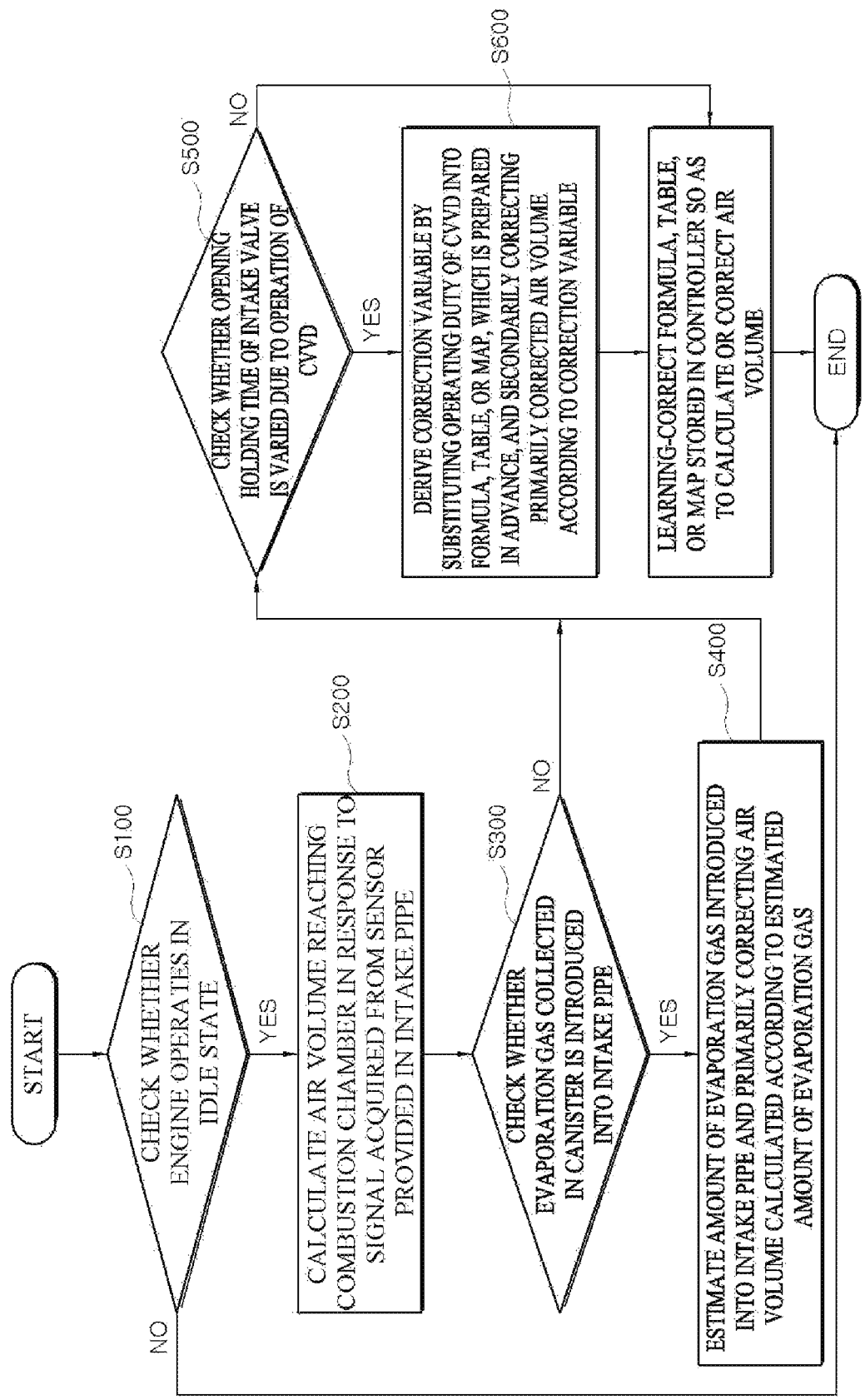
FIG. 3 is a flowchart illustrating a method of determining an air volume in an active purge system according to an exemplary embodiment of the present invention.

As shown in FIG. 3, the method of determining an air volume in an active purge system according to an exemplary embodiment of the present invention includes checking, by a controller 100, whether an engine 200 operates in an idle state (S100); determining, by the controller 100, an air volume reaching a combustion chamber of the engine 210 in a response to a signal received from a sensor provided in an intake pipe of the engine 300 (S200); checking, by the controller 100, whether an evaporation gas collected in a canister 500 is introduced into the intake pipe 300 (S300); when the evaporation gas is determined as being introduced into the intake pipe 300, estimating, by the controller 100, an amount of the evaporation gas introduced into the intake pipe 300 and arithmetically primarily correcting the air volume determined according to the estimated amount of the evaporation gas (S400); checking, by the controller 100, whether an opening holding time of an intake valve in the engine is varied due to an operation of a continuously variable valve duration (CVVD) system 400 (S500); and deriving, by the controller 100, a correction variable by substituting an operation duty of the CVVD system 400 into a predetermined formula, a predetermined table, or a predetermined map, and arithmetically secondarily correcting the primarily corrected air volume according to the correction variable (S600).

An idling refers to that the engine 200 continuously operates at a lowest number of revolutions, and the part load refers to a state in which the engine 200 generates a torque that is smaller than a generatable maximum torque. The torque of the engine 200 is measured in a transmission in real time.

Preferably, in the checking of whether the engine 200 operates in the idle state (S100), the controller 100 checks whether a temperature of cooling water of the engine 200 is greater than or equal to a predetermined value. When the engine 200 is not in the idle state or the temperature of the cooling water is less than the predetermined value, the controller 100 interrupts evaporation gas purge treatment or the operation of the CVVD system 400. In the instant case, the predetermined value is 50 degrees Celsius. When the temperature of the cooling water is less than the predetermined value, the controller 100 determines as a cold state. In the cold state, since a combustion characteristic and an exhaust gas being generated are different from those in a hot state, the evaporation gas purge or the operation of the CVVD system 400 is prohibited in the cold state.

The sensor includes a hot-film air mass flow (HFM) sensor 310 located between the air filter and the throttle valve and a manifold absolute pressure sensor (MAP) 320 located between the throttle valve and the combustion chamber 210. The controller 100 simultaneously receives signals from the HFM sensor 310 and the MAP sensor 320. The controller 100 derives a rotation angle of a cam, a rotation angle of a crankshaft, a fuel injection pressure, and the like from signals received through various sensors provided in a vehicle.

When the evaporation gas is checked as not being introduced into the intake pipe 300 in the checking of whether the evaporation gas collected in the canister 500 is introduced into the intake pipe 300 (S300), the controller 100 performs the checking of whether the opening holding time of the intake valve is varied due to the operation of the CVVD system 400 (S500).

Furthermore, in the checking of whether the opening holding time of the intake valve is varied due to the operation of the CVVD system 400 (S500), when the CVVD system 400 is not operated, the controller 100 determines that the engine 200 is not switched from the idle state to the part load state.

Figure 4:
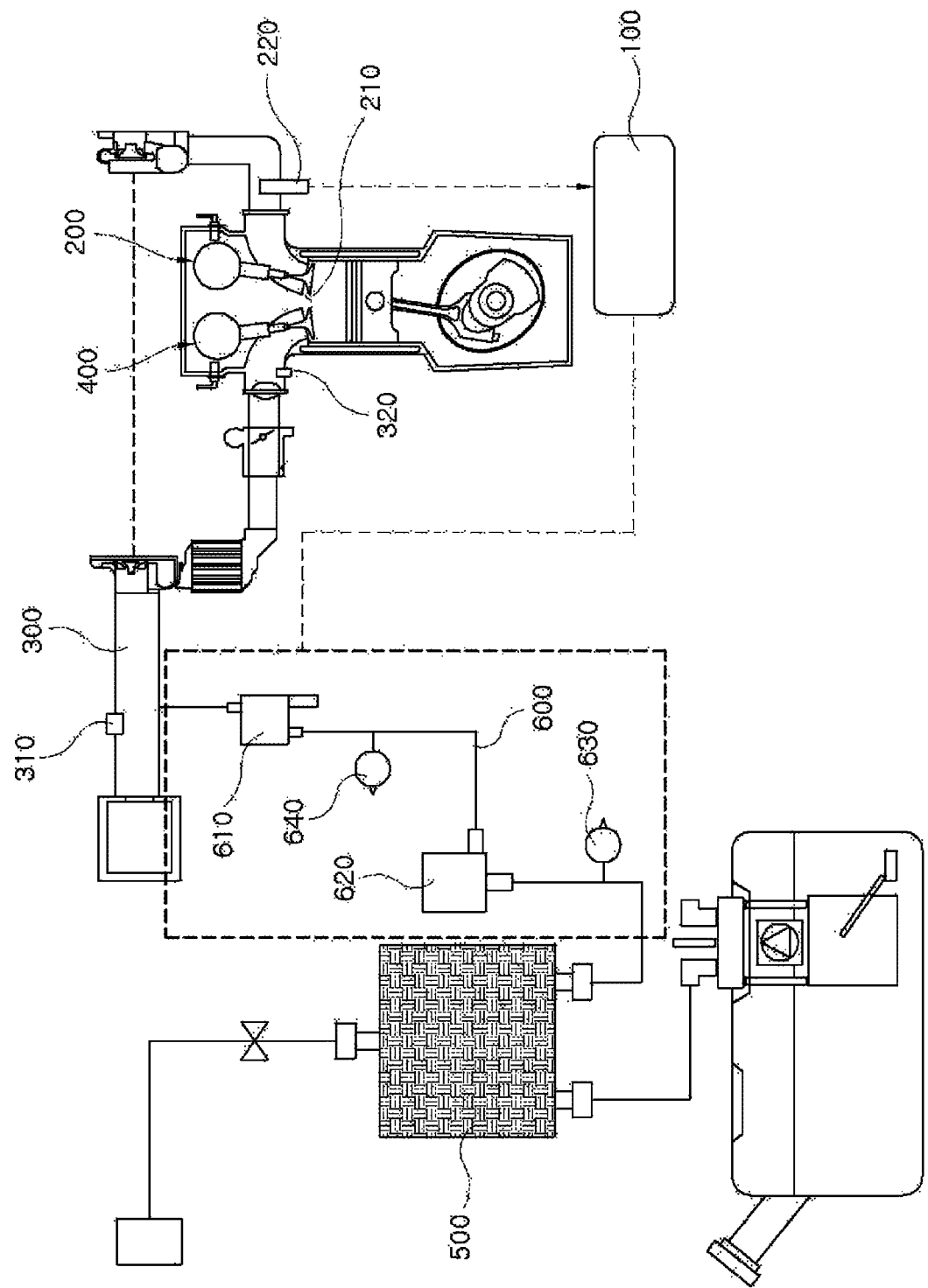
FIG. 4 is an exemplary diagram illustrating a system to which the method of determining an air volume in an active purge system of FIG. 3 is applied.

Meanwhile, the method of determining an air volume in an active purge system according to an exemplary embodiment of the present invention is applied to a system as shown in FIG. 4. As shown in FIG. 4, the canister 500 is connected to the intake pipe 300 through a purge line 600. A purge control valve 610 is provided in the purge line 600. A purge pump 620 is provided between the purge control valve 610 and the purge line 600. A first pressure sensor 630 is provided between the canister 500 and the purge pump 620. A second pressure sensor 640 is provided between the purge pump 620 and the purge control valve 610.

In the estimating, by the controller 100, of the amount of the evaporation gas introduced into the intake pipe 300 and arithmetically primarily correcting the air volume determined according to the estimated amount of the evaporation gas (S400), the controller 100 estimates the amount of the evaporation gas from an operation duty of the purge pump 620. In addition to the operation duty of the purge pump 620, the controller 100 may estimate the amount of the evaporation gas from the number of RPM of the purge pump 620, opening and closing timings of the purge control valve 610, an opening amount of the purge control valve 610, a signal generated from the first pressure sensor 630, and a signal generated from the second pressure sensor 640.

The evaporation gas is compressed by the purge pump 620 between the purge pump 620 and the purge control valve 610. The compressed evaporation gas may be injected into the intake pipe 300 by controlling the opening and closing timings and the opening amount of the purge control valve 610. An amount of the evaporation gas injected into the intake pipe 300 may be controlled by controlling a compression degree of the evaporation gas and an operation of the purge control valve 610.

A concentration and a density of the evaporation gas may be determined according to a difference between a duty and the number of RPM of the purge pump 620 and between pressures measured by the first pressure sensor 630 and the second pressure sensor 640. A concentration, a density, an amount, and the like of hydrocarbon contained in the evaporation gas, and a concentration, a density, an amount, and the like of air contained in the evaporation gas may be estimated from the concentration or the density of the evaporation gas.

A formula, a graph, a table, and the like for determining the concentration, the density, and the amount of the air or the hydrocarbon contained in the evaporation gas are stored in the controller 100 as variables such as the duty and the number of RPM of the purge pump 620, the opening and closing timings and the opening amount of the purge control valve 610, and the difference between the pressures measured through the first pressure sensor 630 and the second pressure sensor 640.

As shown in FIG. 4, the CVVD system 400 is mounted on the camshaft. The CVVD system 400 controls an operation of opening or closing of the intake valve or the exhaust valve according to the rotation angle of the camshaft.

In the checking of whether the opening holding time of the intake valve is varied due to the operation of the CVVD system 400 (S500), the controller 100 checks the operation of the CVVD system 400.

The operation of the CVVD system 400 is checked by a signal transmitted from the CVVD system 400 to the controller 100 or a command signal for performing an operation, which is transmitted from the controller 100 to the CVVD system 400. The controller 100 receives signals from the sensors provided in the engine 200 and the transmission and checks whether the number of RPM of the engine 200 is increased and the torque thereof is increased.

When the CVVD system 400 is operated, the controller 100 performs the deriving of the correction variable by substituting the operation duty of the CVVD SYSTEM 400 into the formula, the table, or the map, which is provided in advance, and arithmetically secondarily correcting the primarily corrected air volume according to the correction variable (S600).

The operation duty of the CVVD system 400 means variations in magnitudes of a voltage, power, and a current which are applied for the operation of the CVVD system 400. The operation duty of the CVVD system 400 is substituted into a conversion formula, which is provided in advance, or substituted into a conversion graph, a conversion table, or the like, and converted into a correction variable of the air volume. For example, the correction variable of the air volume may be a value obtained by multiplying the operation duty of the CVVD system by 0.001.

Meanwhile, the fuel is supplied according to the air volume, and the engine 200 operates. The controller 100 continuously derives an amount of oxygen contained in the exhaust gas discharged from the engine 200 according to a signal received from a lambda sensor 220 provided in an exhaust pipe. The controller 100 determines whether lean combustion or rich combustion occurs according to the derived amount of oxygen. Furthermore, to determine or correct the air volume according to a set target such that combustion may be generated to be rich or lean, the controller 100 corrects the formula, the table, or the map which is stored in the controller 100 as a calculation or conversion model.

As described above, in accordance with the method of determining an air volume in an active purge system according to an exemplary embodiment of the present invention, the controller 100 determines the air volume reaching the combustion chamber 210 in a response to a signal received from the sensor provided in the intake pipe 300; estimates the amount of the evaporation gas reaching the combustion chamber 210 during evaporation gas treatment; primarily corrects the air volume according to the estimated amount of the evaporation gas; and when the CVVD system 400 is operated, secondly corrects the air volume according to an operation degree of the CVVD system 400.

Therefore, when a state of the engine 200 is switched from the idle state to the portion load state, the evaporation gas is treated, or, even when the CVVD system 400 is operated, the determined air volume may be appropriately corrected, and the lambda value may be controlled such that combustion close to the theoretical air-fuel ratio may be generated. Consequently, when the state of the engine 200 is switched from the idle state to the portion load state, misfire may be prevented, and the exhaust gas may be prevented from being excessively discharged.

As described above, in accordance with the method of determining an air volume in an active purge system according to an exemplary embodiment of the present invention, a controller can determine an air volume reaching a combustion chamber of the engine in a response to a signal received from a sensor provided in an intake pipe; estimate an amount of an evaporation gas reaching the combustion chamber during evaporation gas treatment; primarily correct the air volume according to the estimated amount of the evaporation gas; and when a continuously variable valve duration (CVVD) system is operated, secondly correct the primarily corrected air volume according to an operation degree of the CVVD system.

Therefore, when a state of an engine is switched from an idle state to a part load state, the evaporation gas may be treated, or, even when the CVVD system is operated, the estimated air volume may be appropriately corrected, and a lambda value may be controlled such that combustion close to the theoretical air-fuel ratio may be generated. Consequently, when the state of the engine is switched from the idle state to the part load state, misfire may be prevented, and the exhaust gas may be prevented from being excessively discharged.

Furthermore, the term "controller" refers to a hardware device including a memory and a processor configured to execute one or more steps interpreted as an algorithm structure. The memory may be a non-transitory storage medium including program instructions which store algorithm steps, and the processor executes the algorithm steps to perform one or more processes of a method in accordance with various exemplary embodiments of the present invention. The controller according to exemplary embodiments of the present invention may be implemented through a non-volatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The controller may be at least one microprocessor operated by a predetermined program which may include a series of commands for carrying out a method in accordance with various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of determining an air volume in a purge system, the method comprising:
    checking, by a controller, whether an engine operates in an idle state;
    determining, by the controller, the air volume reaching a combustion chamber of the engine in a response to a signal received from a sensor mounted in an intake pipe, when the engine operates in the idle state;
    checking, by the controller, whether an evaporation gas collected in a canister is introduced into the intake pipe, when the engine operates in the idle state;
    when the evaporation gas is determined as being introduced into the intake pipe, estimating, by the controller, an amount of the evaporation gas introduced into the intake pipe and firstly correcting the air volume determined according to the estimated amount of the evaporation gas;
    checking, by the controller, whether an opening holding time of an intake valve in the engine is varied due to an operation of a continuously variable valve duration (CVVD) system electrically connected to the controller; and
    when the opening holding time of the intake valve in the engine is varied due to the operation of the CVVD system, deriving, by the controller, a correction variable based on an operation duty of the CVVD, and secondarily correcting the firstly corrected air volume according to the correction variable.

2. The method of claim 1,
    wherein, in the checking of whether the engine operates in the idle state, the controller is configured to check whether a temperature of a cooling fluid of the engine is greater than or equal to a predetermined value, and
    wherein, upon determining that the engine is not in the idle state or the temperature of the cooling fluid is less than the predetermined value, the controller interrupts evaporation gas purge treatment of the purge system or an operation of the CVVD system.

3. The method of claim 1, wherein the sensor includes:
    a hot-film air mass flow (HFM) sensor located between an air filter and a throttle valve; and
    a manifold absolute pressure (MAP) sensor located between the throttle valve and the combustion chamber.

4. The method of claim 1,
wherein the canister is connected to the intake pipe through a purge line;
wherein a purge control valve is mounted in the purge line;
wherein a purge pump is mounted on the purge line between the purge control valve and the canister;
wherein a first pressure sensor is mounted on the purge line between the canister and the purge pump;
wherein a second pressure sensor is mounted on the purge line between the purge pump and the purge control valve; and
wherein the controller is configured to estimate an amount of the evaporation gas from an operation duty of the purge pump.

5. The method of claim 4, wherein the controller is configured to estimate the amount of the evaporation gas from a number of revolutions per minute (RPM) of the purge pump, opening or closing timings of the purge control valve, an opening amount of the purge control valve, a signal generated from the first pressure sensor, and a signal generated from the second pressure sensor.

6. The method of claim 1, wherein the deriving, by the controller, the correction variable based on the operation duty of the CVVD includes deriving, by the controller, the correction variable by substituting the operation duty of the CVVD system into a predetermined formula, a predetermined table, or a predetermined map.

7. The method of claim 6,
wherein the engine is configured to operate according to the firstly or secondarily corrected air volume; and
wherein the predetermined formula, the predetermined table, or the predetermined map stored in the controller is learning-corrected, to determine or correct the air volume according to an amount of oxygen contained in an exhaust gas discharged from the engine.

8. The method of claim 1, wherein the controller includes:
a processor; and
a non-transitory storage medium on which a program for performing the method of claim 1 is recorded and executed by the processor.

9. A non-statutory computer readable medium on which a program for performing the method of claim 1 is recorded.

10. A purge system of a vehicle, the purge system comprising:
a canister connected to an intake pipe of an engine through a purge line;
a purge control valve mounted in the purge line;
a purge pump mounted on the purge line between the purge control valve and the canister;
a sensor mounted in the intake pipe; and
a controller electrically connected to the sensor and configured of:
checking whether the engine operates in an idle state;
determining an air volume reaching a combustion chamber of the engine in a response to a signal received from the sensor when the engine operates in the idle state;
checking whether an evaporation gas collected in the canister is introduced into the intake pipe, when the engine operates in the idle state;
when the evaporation gas is determined as being introduced into the intake pipe, estimating an amount of the evaporation gas introduced into the intake pipe and firstly correcting the air volume according to the estimated amount of the evaporation gas;
checking whether an opening holding time of an intake valve in the engine is varied due to an operation of a continuously variable valve duration (CVVD) system electrically connected to the controller; and
when the opening holding time of the intake valve in the engine is varied due to the operation of the CVVD system, deriving a correction variable based on an operation duty of the CVVD, and secondarily correcting the firstly corrected air volume according to the correction variable.

11. The purge system of claim 10, wherein the controller is configured to estimate the amount of the evaporation gas from an operation duty of the purge pump.

12. The purge system of claim 10,
wherein, in the checking of whether the engine operates in the idle state, the controller is configured to check whether a temperature of a cooling fluid of the engine is greater than or equal to a predetermined value, and
wherein, upon determining that the engine is not in the idle state or the temperature of the cooling fluid is less than the predetermined value, the controller interrupts evaporation gas purge treatment of the purge system or an operation of the CVVD system.

13. The purge system of claim 10, wherein the sensor includes:
a hot-film air mass flow (HFM) sensor located between an air filter and a throttle valve; and
a manifold absolute pressure (MAP) sensor located between the throttle valve and the combustion chamber.

14. The purge system of claim 10, further including:
a first pressure sensor mounted on the purge line between the canister and the purge pump; and
a second pressure sensor mounted on the purge line between the purge pump and the purge control valve.

15. The purge system of claim 14, wherein the controller is configured to estimate the amount of the evaporation gas from a number of revolutions per minute (RPM) of the purge pump, opening or closing timings of the purge control valve, an opening amount of the purge control valve, a signal generated from the first pressure sensor, and a signal generated from the second pressure sensor.

16. The purge system of claim 10, wherein the deriving, by the controller, the correction variable based on the operation duty of the CVVD includes deriving, by the controller, the correction variable by substituting the operation duty of the CVVD system into a predetermined formula, a predetermined table, or a predetermined map.

17. The purge system of claim 16,
wherein the engine is configured to operate according to the firstly or secondarily corrected air volume; and
wherein the predetermined formula, the predetermined table, or the predetermined map stored in the controller is learning-corrected to determine or correct the air volume according to an amount of oxygen contained in an exhaust gas discharged from the engine.

* * * * *